April 22, 1941.                J. L. STRATTON                2,239,432
                  EXCITATION CIRCUIT FOR DYNAMOELECTRIC MACHINES
                              Filed July 12, 1939

Opposing; inverter action.

Aiding; rectifier action.

Inventor:
Jerry L. Stratton,
by Harry E. Dunham
His Attorney.

Patented Apr. 22, 1941

2,239,432

UNITED STATES PATENT OFFICE 2,239,432

EXCITATION CIRCUIT FOR DYNAMO-ELECTRIC MACHINES

Jerry L. Stratton, Schenectady, N. Y., assignor to General Electric Company, a corporation of New York Application July 12, 1939, Serial No. 284,036

10 Claims. (Cl. 171—119)

My invention relates to electric valve circuits and more particularly to electric valve excitation circuits for dynamoelectric machines.

The use of electric valve apparatus, particularly electric valve apparatus of the type employing ionizable mediums, in connection with the control of dynamoelectric machines, has become very desirable in view of their inherent rapidity of response to a controlling influence. For example, electric valve apparatus has been found very satisfactory in exciters for controlling the voltage of dynamoelectric machines, both of the direct current type and of the alternating current synchronous type. In accordance with the teachings of my invention described hereinafter, I provide a new and improved excitation system for dynamoelectric machines and which employs electric valve translating apparatus for effecting rapid and precise control of an electrical condition of the dynamoelectric machines.

It is an object of my invention to provide a new and improved electric translating circuit.

It is another object of my invention to provide a new and improved excitation circuit for dynamoelectric machines.

It is a further object of my invention to provide a new and improved electric valve translating circuit for dynamoelectric machines.

It is a still further object of my invention to provide a new and improved excitation system for a dynamoelectric machine and including an exciter and an electronic sub-exciter whereby a predetermined electrical condition, such as the voltage of the principal dynamoelectric machine, may be rapidly and precisely controlled.

Briefly stated, in the illustrated embodiment of my invention, I provide a new and improved excitation system for dynamoelectric machines including an exciter, an electronic sub-exciter whereby an electrical condition, such as the voltage, of the principal machine may be rapidly and precisely controlled, and in which the rating of the electric valve means is relatively small as compared with the required excitation power of the exciter.

Figure 1:
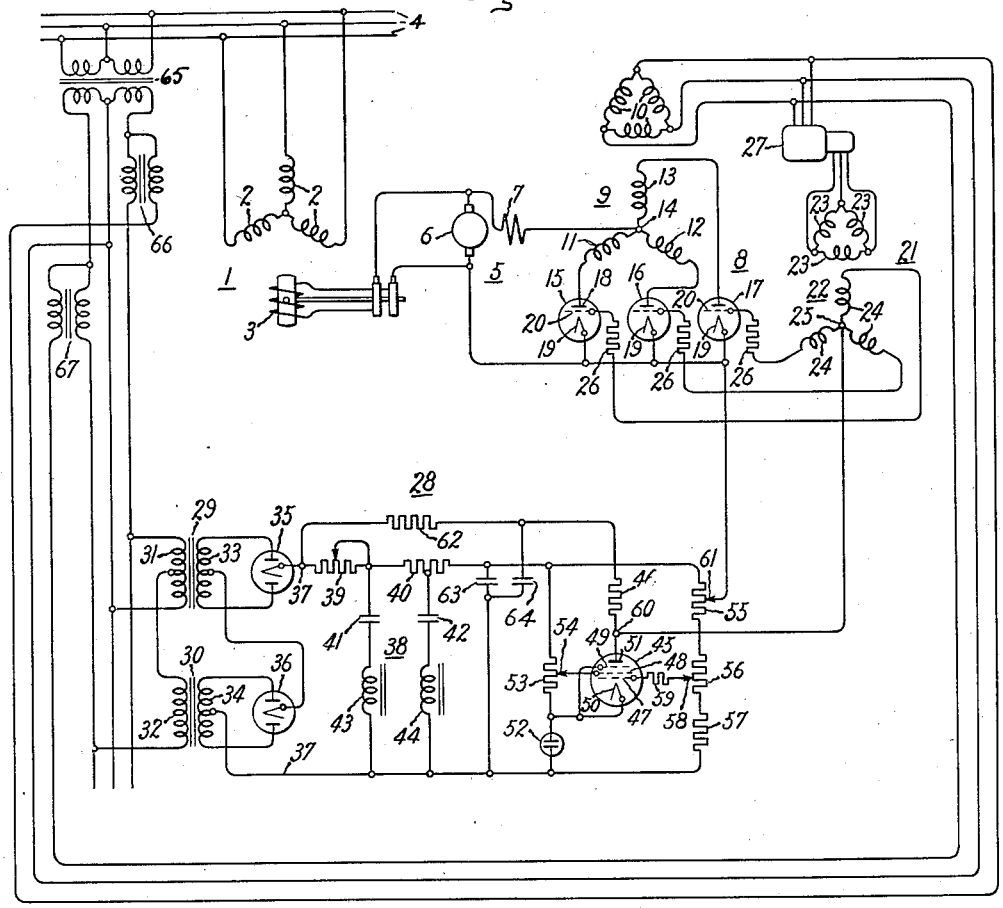
Figure 2:
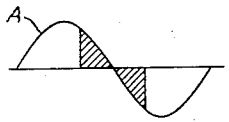
Figure 3:
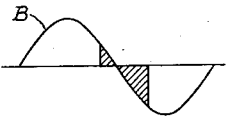
Figure 4:
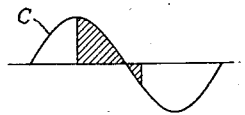

For a better understanding of my invention, reference may be had to the following description taken in connection with the accompanying drawing, and its scope will be pointed out in the appended claims. In Fig. 1 of the accompanying drawing my invention is diagrammatically illustrated as applied to an excitation system for an alternating current dynamoelectric machine of the synchronous type, and Figs. 2, 3 and 4 represent certain operating characteristics of the arrangement shown in Fig. 1.

Referring now to Fig. 1 of the drawing, my invention is there diagrammatically illustrated as applied to an excitation system for a dynamoelectric machine 1, which may be of the synchronous alternating current type, comprising armature windings 2 and a field winding 3. The armature windings 2 may be connected to a suitable alternating current circuit 4, which may be a polyphase circuit, such as a three phase circuit. The larger portion or the principal portion of the energy transmitted to the field winding 3 of machine 1 is supplied by an exciter 5 having an armature winding 6 and a field winding 7 which controls the output or armature voltage of the exciter.

In order variably to energize the field winding 7 to control the output voltage, or the armature voltage, of the exciter 5 and thereby to vary the energization of the field winding 3 to maintain a predetermined electrical condition, such as the armature voltage of the machine 1 at a predetermined constant value, I provide an electronic sub-exciter 8 which may include an inductive network provided by a transformer 9 having a plurality of primary windings 10 and a plurality of secondary windings 11, 12, and 13. Secondary windings 11–13 may be provided with an electrically neutral connection 14 which is connected to one terminal of the field winding 7 of the exciter 5. The electronic sub-exciter 8 also includes electric valve means which may be individual electric valves 15, 16, and 17. The electric valve means, of course, may be of the type in which all of the electric discharge paths are within a single enclosing receptacle. For the purpose of illustration, the electric valve means have been shown as being of the individual type, each comprising an anode 18, a cathode 19, and a control member or grid 20. The electric valve means 15–17 are preferably of the type comprising an ionizable medium such as a gas or a vapor.

As an agency for controlling the conductivities of the electric valves 15–17, I provide a control circuit 21 which may comprise a transformer 22 having primary windings 23 and secondary windings 24. Secondary windings 24 are provided with a neutral connection 25 and the secondary windings are each connected to the control members 20 of the different electric valves through individual current limiting resistances 26. The control circuit 21 impresses alternating voltages on the control members 20 and these alternating control voltages may be adjustable in phase with respect to the anode voltages of the respective electric valve means. I provide any suitable arrangement, such as a rotary phase shifter 27, for controlling or adjusting the phase of the alternating grid voltages with respect to the anode voltages.

I employ in my system certain features broadly disclosed and claimed in a copending patent application Serial No. 196,456 of Elmo E. Moyer, filed March 17, 1938, and which is assigned to the assignee of the present application. More specifically, I employ the feature of operating electric valve apparatus connected in the field winding of a dynamoelectric machine for transmitting energy to the field winding from an alternating current supply circuit, or for transmitting energy from the field winding to the alternating current supply circuit, depending upon an electrical condition derived from the machine.

To control the electronic sub-exciter 8 to transmit power to or receive power from the field winding 7 of the exciter 5 and hence to control rapidly the output voltage of the exciter 5 in response to a predetermined controlling influence, such as the voltage of circuit 4 or the output armature voltage of machine 1, I provide a control circuit 28 which may be a voltage responsive circuit. Certain features of the control circuit 28 are disclosed and claimed in a copending application for Letters Patent Serial No. 232,599 of Elmo E. Moyer, filed September 30, 1938, and assigned to the assignee of the present application. Certain other features of circuit 28 are disclosed and claimed in my copending patent application for Letters Patent Serial No. 274,765, filed May 20, 1939, and assigned to the assignee of the present application. The control circuit 28 may comprise transformers 29 and 30 having primary windings 31 and 32 arranged in Scott-connection relative to the three phase alternating current circuit 4 and having secondary windings 33 and 34, respectively, which energize rectifying means such as electric valves 35 and 36, respectively. The output circuits of the electric valves 35 and 36 are connected in series relation to energize a direct current circuit 37, the voltage of which varies in accordance with the polyphase voltages of circuit 4. A filter circuit 38 may be connected to circuit 37 to filter the voltage thereof and may comprise an adjustable resistance 39, a resistance 40, capacitances 41 and 42 and inductances 43 and 44. In order to energize the control grids 20 of electric valves 15–17 to cause the electronic sub-exciter 8 to transmit variable amounts of power to the field winding 7, or to absorb variable amounts of power from the field winding 7, I provide an electronic discharge device 45 and a suitable impedance element, such as a resistance 46 connected in series relation therewith for impressing on the control grids 20 a variable undirectional potential. The electronic discharge device 45 is preferably of the high vacuum type and may have a plurality of control members or control grids. The electronic discharge device 45 may be of the type employing a conventional control grid 47, a screen grid 48, a suppressor grid 49 which may be connected to the cathode 50, and an anode 51 may be connected to the resistance 46. In order to impress on one of the control members, such as the screen grid 48, substantially the entire increment or decrement of the voltage of circuit 37 with respect to a predetermined reference value, I employ a circuit including a serially connected constant voltage device, such as a glow discharge device 52, and a voltage divider 53. An adjustable contact 54 connects the screen grid 48 to the voltage divider. As a means for increasing the sensitivity of the electronic discharge device with respect to variations in the voltage of circuit 37, I provide a voltage divider which may include resistances 55, 56, and 57. A predetermined component of the variation in voltage of circuit 37 is impressed on the control grid 47 through an adjustable contact 58 which is associated with the voltage divider. A suitable current limiting resistance 59 may be connected in series relation with the control grid 47. A common juncture 60 of the electronic discharge device 45 and the resistance 46 is connected to the neutral connection 25 of secondary windings 24 so that a variable unidirectional potential is impressed on the control grids 20. Cathodes 19 of the electric valves 15–17 may be connected to a suitable point on the voltage divider, such as resistance 55, through an adjustable contact 61. When it is desired to supply power to the anode-cathode circuit of the electronic discharge device 45 at a voltage which is somewhat larger than the voltage supplied to the grid circuits for the electronic discharge device 45, I may employ a circuit including a resistance 62 and capacitances 63 and 64 which serve to increase the voltage applied to the anode-cathode circuit.

In order to reduce the size of the auxiliary equipment required by the system, I provide a transformer 65 which not supplies a control voltage to the control circuit 28 but also transmits power between circuit 4 and the electronic sub-exciter 8. The transformer 65 may be arranged in an open-delta connection. Inasmuch as the sub-exciter 8 transmits a relatively small amount of power as compared with the rating of the exciter 5, the rating of the transformer 65 is accordingly relatively small as compared with the exciting kilowatts required by the exciter 5, or the exciting kilowatts required by the machine 1.

I provide suitable compensating means for controlling the voltage impressed on the circuit 28 in accordance with the variations in power transmitted to or received from the electronic sub-exciter 8 so that the output voltage of transformer 65 is a true representation of the voltage of circuit 4. This voltage compensating means may be inductive reactances 66 and 67 which serve to maintain a predetermined relation between the voltage of circuit 4 and the voltage impressed on control circuit 28, and thereby to compensate for output voltage variations of transformer 65 occasioned by changes in the amount and direction of power transmitted by the electronic sub-exciter 8.

The operation of the embodiment of my invention shown in Fig. 1 of the drawing will be explained by considering the system when the dynamoelectric machine 1 is operating as an alternating current generator of the synchronous type to energize the alternating current circuit 4. Variable amounts of unidirectional current are transmitted to the field winding 3 of machine 1 to maintain the terminal or armature voltage at a substantially constant value. The electronic sub-exciter 8 transmits variable amounts of current to the field winding 7 of exciter 5 and hence controls the terminal or armature voltage of the exciter 5.

The amount of current transmitted to the field winding 7, that is, the magnitude of the average value of unidirectional current transmitted to the field winding 7, is dependent upon the phase displacement between the resultant periodic voltages impressed on the control grids 20 relative to the anode-cathode voltages of the electric valve means 15-17. The average value of the output current of these electric valves, when operating as a rectifier, is increased as the resultant grid voltages are advanced from a lagging position to the position of phase coincidence, and the average output voltage is decreased as the grid voltages are retarded in phase with respect to the respective anode-cathode voltages. It will be appreciated by those skilled in the art that the electric valve means 15-17 may be controlled in a number of ways; that is, the electric valve means may be controlled by impressing on the control grids rectified unidirectional voltages of adjustable phase position, or the conductivities may be controlled by controlling the magnitude or the phase, or both the magnitude and the phase, of the alternating voltages impressed on the control grids 20. In the particular embodiment illustrated, the conductivities of the electric valve means 15-17 are controlled by superimposing on the control grids 20 an alternating component of voltage of predetermined phase displacement and a variable unidirectional biasing or control potential which is supplied by the control circuit 28. The rotary phase shifter 27 is adjusted to a suitable angle of lag; that is, it may be adjusted to impress on the control grids 20 an alternating component of voltage displaced, for example, 45 or 90 electrical degrees in the lagging direction with respect to the anode voltages. Control circuit 28 superimposes a variable unidirectional control potential on the control grids 20 to control the conductivities and hence control the average output current of the electric valve means.

The control circuit 28 produces the variable unidirectional control voltage by transmitting variable amounts of unidirectional current through the resistance 46 and thereby controls the potential difference between the connections 60 and 61. As the voltage of the circuit 4 increases, the conductivity of the electronic discharge device 45 is increased to transmit a larger amount of unidirectional current through resistance 46 and thereby lower the potential of point 60 relative to the contact 61 and effect a decrease in the conductivities of the electric valves 15-17, tending to restore the output voltage of the machine 1 to the desired value. Conversely, if the voltage of the circuit 4 tends to decrease below the desired value, the current conducted through the resistance 46 is decreased and the unidirectional control potential is raised, causing an increase in the conductivities of the electric valves 15-17 to increase the output voltage of the machine 1.

During rapidly varying load conditions imposed on a dynamoelectric machine, it is important, and in some instances essential, that the voltage regulating system be capable of responding in very short intervals of time. These requirements are most marked in systems employing synchronous apparatus and where it is desired to maintain the system in synchronism under conditions which involve large increments and decrements of load. My invention operates to effect accurate and rapid control of the output voltage of machine 1. My system not only permits rapid variations in the amount of energy transmitted to the field winding 7 of the exciter 5, but also functions to permit the electronic sub-exciter 8 to operate as an inverter to effect a decrease in the energization of the field winding 7 when the control circuit 28 dictates a decrease in the voltage of the circuit 4, or a decrease in the terminal voltage of machine 1. That is, the sub-exciter 8 is capable of acting not only as a rectifier but is also capable of operating as an inverter for transmitting power from the field winding 7 of the exciter 5 to the alternating current circuit 4.

The electronic sub-exciter 8 may operate within either the rectifier region or the inverter region of operation, or may operate merely as a conducting path, neither aiding nor opposing the output voltage of the exciter 5. The operation of the electronic sub-exciter 8 may be better understood by referring to Figs. 2, 3, and 4. Curve A of Fig. 2 represents the operation of the sub-exciter 8 when it is acting as a conducting path, neither aiding nor opposing the flow of current to the field winding 7. Curve B of Fig. 3 represents the effective terminal voltage of the electronic sub-exciter 8 when it is operating as an inverter, opposing the armature voltage of exciter 5, to transmit energy from the field winding 7 to the alternating current circuit 4 through transformer 9. Curve C of Fig. 4 shows operating characteristics of the electronic sub-exciter 8 when it is operating as a rectifier, aiding the armature voltage of exciter 5, to transmit power to the field winding 7 from the alternating current circuit 4. With the particular three-phase arrangement of the electronic sub-exciter 8, if the electric valves 15-17 are rendered conductive at the 120 degree lagging position, as shown in Fig. 2, the average output voltage of the electric valves is zero. The reason for this, of course, is that the conduction period includes 60 degrees of the positive voltage and 60 degrees of the negative voltage. If the beginning of the conducting periods lags more than 120 electrical degrees, the electric valves operate as an inverter to oppose the voltage of the exciter 5. On the other hand, if the periods of conduction at the start are less than 120 degrees, as shown in Fig. 4, the output of the electronic exciter 8 aids the voltage of the exciter 5. It is, therefore, understood that the electronic sub-exciter 8 may operate either as a source of positive driving voltage or as a resistance, as viewed by the output voltage of the exciter 5. In this manner, the output voltage of the exciter 5 and the energization of its field winding 7 may be increased or decreased rapidly to effect rapid and precise control of the output voltage of the machine 1.

I have found that the system shown in Fig. 1 operates very satisfactorily when the electronic sub-exciter 8 is controlled to operate as an inverter over the greater portion of the load range of the system or of the exciter 5. That is, for normal changes of load, the regulatory action of the electronic sub-exciter 8 is effected by changing its operation within the inverter region of operation. For large increments of load imposed on the machine 1 and the exciter 5, the control circuit 28 operates to change the electronic sub-exciter 8 from inverter to rectifier operation, so that the electronic sub-exciter 8 introduces into the field circuit for the exciter 5 a positive voltage to assist in the maintenance of the excitation of machine 1 to maintain the output voltage thereof substantially constant. In other words, the electronic sub-exciter for normal variations of load acts as a variable resistance in the field circuit of the exciter 5, absorbing variable amounts of power from the exciter 5 and transmitting the power to the alternating current circuit 4.

The transformer 65 impresses on the control circuit 28 voltages which are representative of the voltage obtaining on the alternating current circuit 4. Of course, it will be understood that as the power transmitted by the electronic sub-exciter 8 varies, the output voltage of the transformer 65 will also vary, due to its regulation, and it is necessary to compensate for these variations in order to effect the desired control of the voltage of the dynamoelectric machine 1. The inductive reactances 66 and 67 operate to impress on the control circuit 28 alternating voltages which have a predetermined constant ratio with respect to the voltage of the alternating current circuit 4. In other words, the reactances 66 and 67 compensate for the variations in output voltage of transformer 65 occasioned by the transmission of variable amounts of power through the transformer 65 under variable load conditions. Moreover, a single transformer 65 of relatively low rating is employed not only to supply the control voltages to control circuit 28 but also to supply the anode-cathode circuit power for the electronic sub-exciter 8.

The inductive reactances 66 and 67 are connected to add voltages to the voltages obtained from the transformer 65 when the electronic sub-exciter 8 is operating as a rectifier so that the voltage impressed on the control circuit 28 is truly representative of the voltage of the circuit 4. The reactances 66 and 67 supply voltages which vary in magnitude in accordance with the amount of power transmitted by the electronic sub-exciter 8. In addition, the inductive reactances 66 and 67 furnish voltages which vary in direction relative to the voltage obtained from circuit 4 through transformer 65, depending upon the direction of power transfer between circuit 4 and sub-exciter 8. When the sub-exciter 8 is operating as a rectifier, the voltages of the inductive reactances 66 and 67 aid the output voltage of transformer 65, and when the sub-exciter 8 operates as an inverter the voltages of the inductive reactances 66 and 67 oppose the output voltage of transformer 65 so that at all times a predetermined constant ratio is maintained between the voltage of circuit 4 and the voltage impressed on control circuit 28.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, a dynamoelectric machine having a field winding, an exciter for energizing said field winding, a sub-exciter comprising an electric value means for supplementing the action of said exciter and comprising a control member for controlling the conduct.ity thereof, and means for impressing on said control member a voltage variable throughout portions of either the rectifier or inverter control characteristic regions to cause said sub-exciter to operate either as a rectifier or as an inverter variably to energize said field winding to maintain a predetermined electrical condition of said machine at a substantially constant value.

2. In combination, a dynamoelectric machine having a field winding, an exciter having an armature winding connected to said field winding and having a field winding, an alternating current circuit, a sub-exciter connected to said circuit and comprising an inductive network including a plurality of windings having a neutral connection connected to one terminal of said last mentioned field winding and comprising electric valve means having control members for controlling the conductivity thereof, means for impressing on said control members a unidirectional voltage variable throughout portions of either the rectifier or inverter characteristic regions to cause said sub-exciter to operate either as a rectifier or as an inverter to transmit power to or receive power from said exciter.

3. In combination, an alternating current circuit, a dynamoelectric machine having an armature winding connected to said circuit and having a field winding, an exciter comprising an armature winding connected to said field winding and having a field winding, a sub-exciter for variably energizing said last mentioned field winding and comprising electric valve means connected to said alternating current circuit, said electric valve means having a control member for controlling the conductivity thereof, and means responsive to a predetermined electrical condition of said alternating current circuit for impressing on said control member a voltage variable within the rectifier or inverter control characteristic regions to cause said sub-exciter to operate either as a rectifier or as an inverter relative to the voltage of said alternating current circuit.

4. In combination, an alternating current circuit, a dynamoelectric machine having an armature winding connected to said circuit and having a field winding, an exciter having an armature winding connected to said field winding and having a field winding, a sub-exciter connected to said last mentioned field winding and comprising an electric valve means connected to said alternating current circuit, said electric valve means having a control member, and means responsive to an electrical condition of said alternating current circuit for controlling the conductivity of said electric valve means by impressing on the control member a voltage variable throughout the rectifier or inverter control characteristic regions to transmit power to or receive power from said exciter to maintain said electrical condition at a substantially constant value.

5. In combination, a three phase alternating current circuit, electric translating apparatus for controlling the voltage of said alternating current circuit and comprising a dynamoelectric machine having a field winding, means for energizing said field winding, a voltage responsive circuit for controlling said last mentioned means and comprising a Scott-connected transformer energized from said alternating current circuit, and means connected between said alternating current circuit and said transformer for controlling the voltage impressed on said transformer to compensate for variations in voltage caused by changes in power transmitted to said field winding.

6. In combination, an alternating current circuit, electric translating apparatus for controlling an electrical condition of said circuit, control means responsive to said electrical condition for controlling said translating apparatus, a transformer connected to said circuit for energizing said translating apparatus and said control means, and means connected between said transformer and said control means to compensate for variations in the output voltage of said transformer occasioned by variations in the amount of power transmitted by said translating apparatus.

7. In combination, an alternating current circuit, electric translating apparatus for controlling an electrical condition of said circuit, electric valve means for controlling said translating apparatus, control means responsive to said electrical condition for controlling said electric valve means, a transformer connected to said circuit for energizing said electric valve means and said control means, and means connected between said transformer and said control means to compensate for variations in the output voltage of said transformer occasioned by variations in the amount of power transmitted by said electric valve means.

8. In combination, an alternating current circuit, a dynamoelectric machine for controlling the voltage of said circuit and comprising a field winding, means for controlling the energization of said field winding comprising an electric valve means, control means responsive to the voltage of said circuit for controlling said electric valve means, a transformer connected to said circuit for energizing said electric valve means and said control means, and means connected between said transformer and said control means to compensate for variations in the output voltage of said transformer occasioned by variations in the amount of power transmitted by said electric valve means.

9. In combination, an alternating current circuit, a dynamoelectric machine for transmitting power to said circuit and comprising a field winding, an exciter for energizing said field winding and having a field winding, an electronic sub-exciter connected in circuit with said second mentioned field winding and comprising electric valve means of the controlled type having a control member for controlling the conductivity thereof, a control circuit responsive to the voltage of said alternating current circuit for impressing on said control member a variable control potential to cause said sub-exciter to operate either as a rectifier or as an inverter to transmit power to or receive power from said exciter, a transformer connected to said alternating current circuit for energizing both said control circuit and said electronic sub-exciter, and means connected between said transformer and said control circuit to compensate for variations in the output voltage of said transformer occasioned by variations in the direction and amount of power transmitted by said electronic sub-exciter.

10. In combination, a direct current dynamoelectric machine having a field winding, electric valve means interposed in series relation with said field winding for controlling the excitation of said machine, said electric valve means being provided with a control member for controlling the conductivity thereof, and means for impressing on said control member a variable voltage to cause said electric valve means to operate either as a rectifier or as an inverter for aiding or opposing the output voltage of said machine.

JERRY L. STRATTON.

CERTIFICATE OF CORRECTION.

Patent No. 2,239,432.  April 22, 1941.

JERRY L. STRATTON.

It is hereby certified that error appears in the printed specification of the above numbered patent requiring correction as follows: Page 2, second column, line 33, after "not" insert --only--; page 4, first column, line 67, claim 1, for the word "value" read --valve--; and that the said Letters Patent should be read with this correction therein that the same may conform to the record of the case in the Patent Office.

Signed and sealed this 27th day of May, A. D. 1941.

(Seal)

Henry Van Arsdale,
Acting Commissioner of Patents.